(12) United States Patent
Bryden

(10) Patent No.: US 8,480,963 B2
(45) Date of Patent: Jul. 9, 2013

(54) LIQUID ARC INDUCED CAVITATION (LAIC) SYSTEM

(76) Inventor: Arthur David Bryden, Victoria (CA)

( * ) Notice: Subject to any disclaimer, the term of this patent is extended or adjusted under 35 U.S.C. 154(b) by 337 days.

(21) Appl. No.: 12/905,034

(22) Filed: Oct. 14, 2010

(65) Prior Publication Data

US 2011/0088802 A1 Apr. 21, 2011

Related U.S. Application Data

(60) Provisional application No. 61/252,958, filed on Oct. 19, 2009.

(51) Int. Cl.
*B01J 19/08* (2006.01)
(52) U.S. Cl.
USPC .................................................. 422/186.27

(58) Field of Classification Search
USPC .................................................... 422/186.27
See application file for complete search history.

(56) References Cited

U.S. PATENT DOCUMENTS

| | | | | |
|---|---|---|---|---|
| 3,607,714 | A * | 9/1971 | Vialaron | 422/186.29 |
| 5,227,038 | A * | 7/1993 | Smalley et al. | 204/173 |
| 5,556,522 | A * | 9/1996 | Ingalls et al. | 204/665 |
| 6,548,027 | B1 * | 4/2003 | Hall et al. | 422/186.04 |
| 2007/0267289 | A1 * | 11/2007 | Jabs et al. | 204/170 |

* cited by examiner

*Primary Examiner* — Kishor Mayekar
(74) *Attorney, Agent, or Firm* — Farjami & Farjami LLP

(57) ABSTRACT

A liquid arc induced cavitation (LAIC) system (also referred to as a pulsed arc electrohydraulic discharge system) for use in reducing contaminants in liquids (e.g. water), having: a moving electrode positioning mechanism with feedback sensors to control the electrode gap geometry; a bank of hybrid capacitors and an air gap switch.

19 Claims, 11 Drawing Sheets

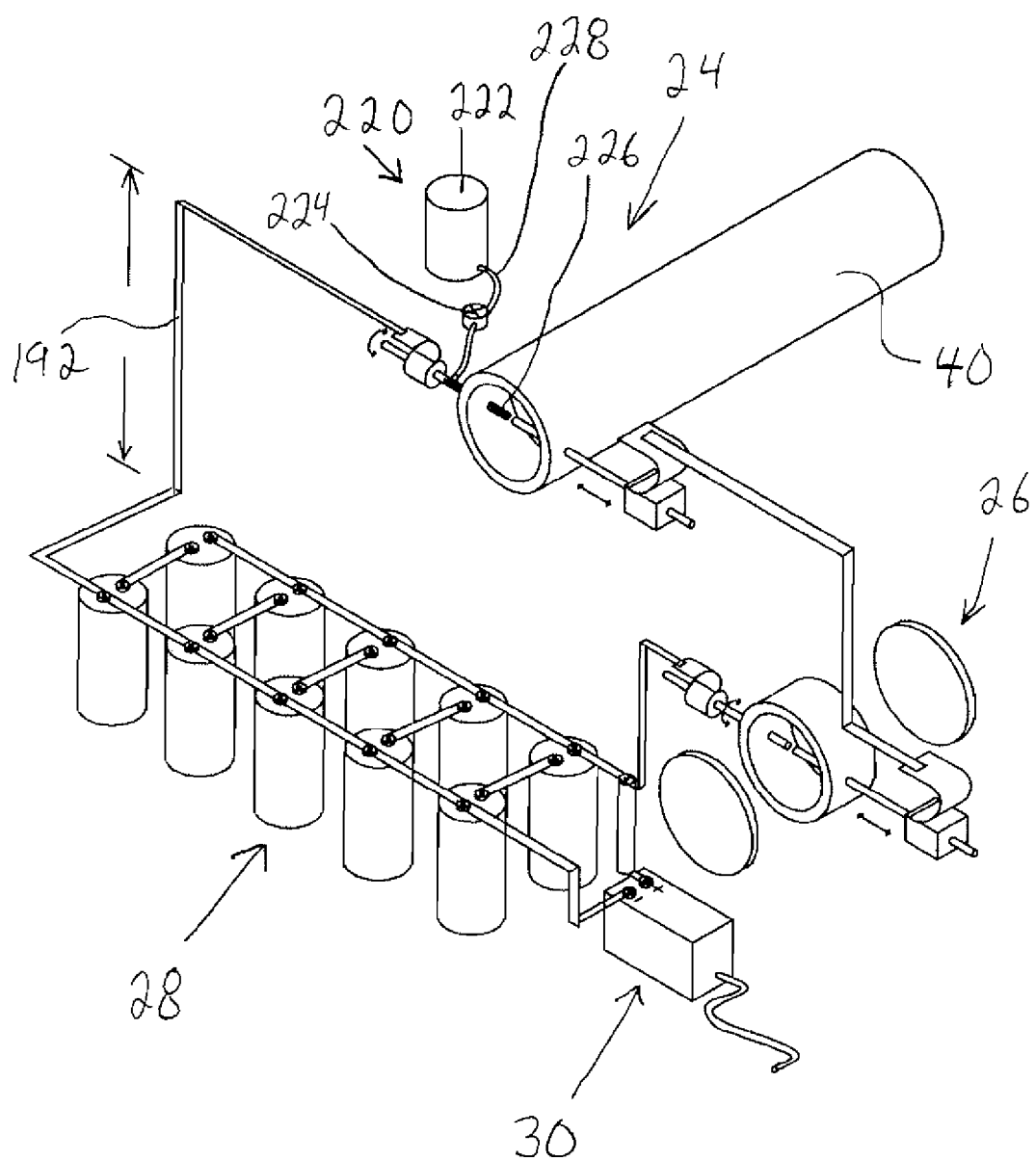

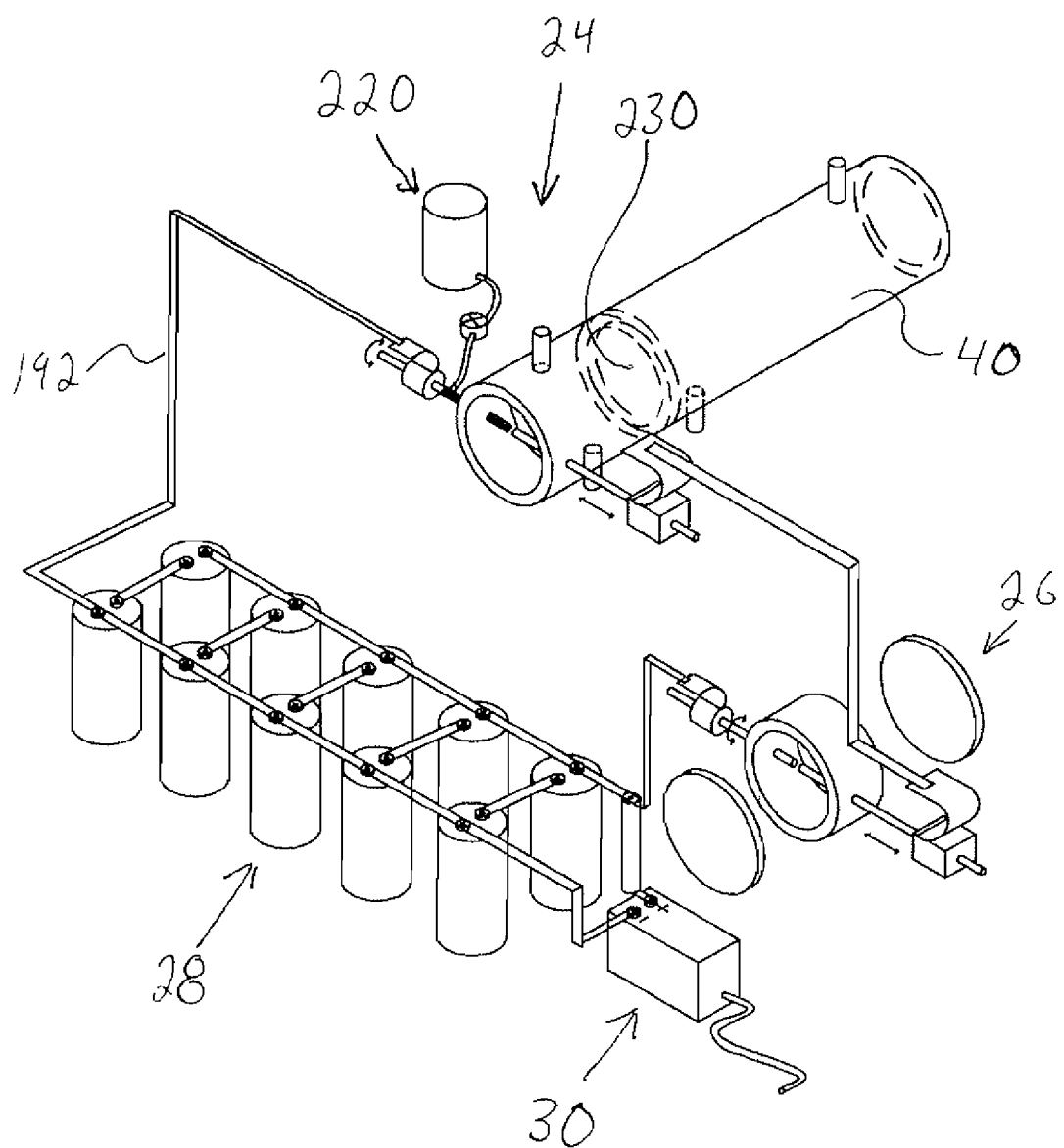

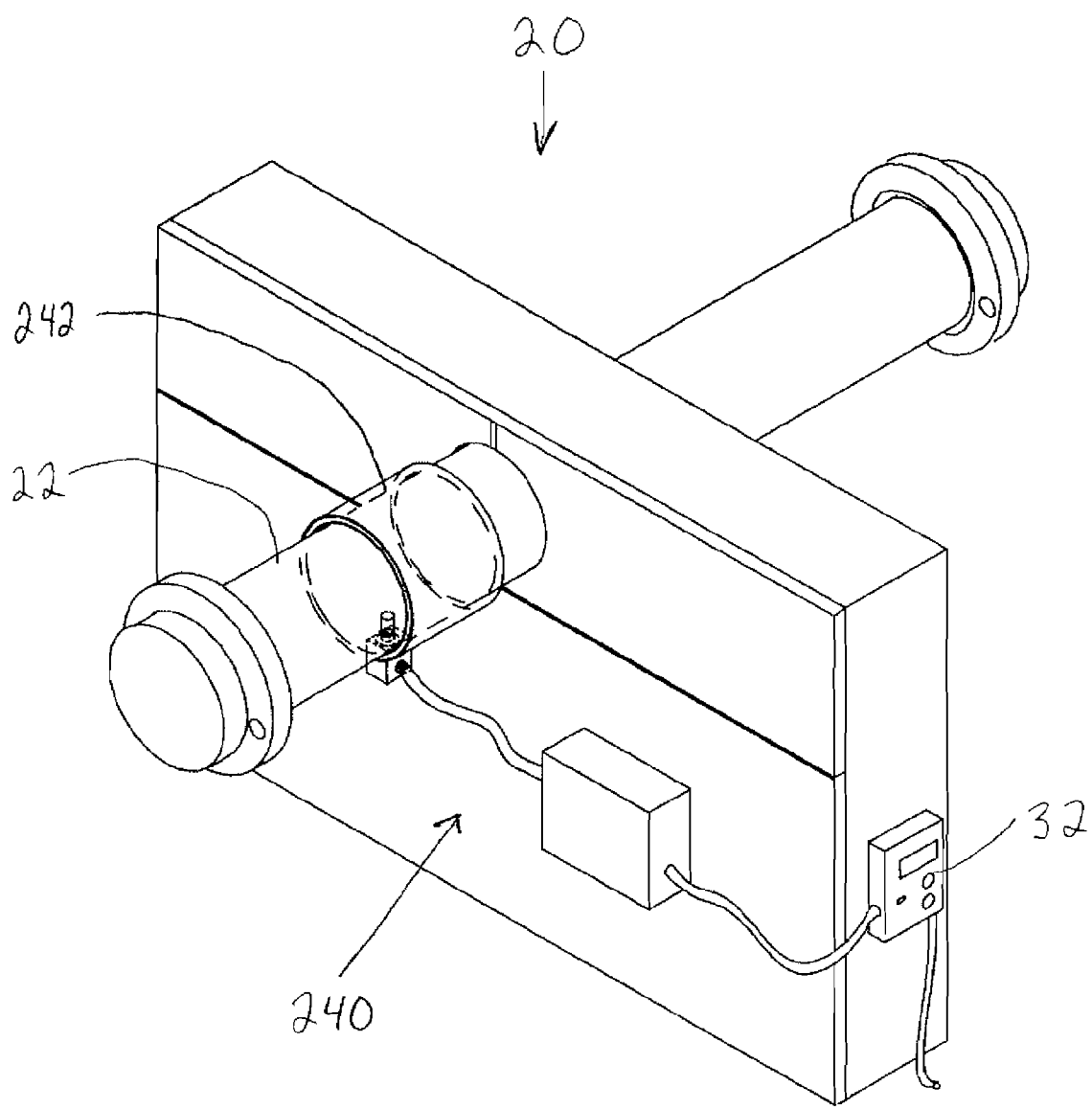

LIQUID ARC INDUCED CAVITATION (LAIC) SYSTEM

This application claims priority to U.S. Provisional Application No. 61/252,958, filed Oct. 19, 2009, which is hereby incorporated by reference in its entirety.

FIELD OF THE INVENTION

The present invention relates to liquid arc induced cavitation (LAIC) systems (also referred to as pulsed arc electrohydraulic discharge systems and plasma sparking devices), and the treatment of liquids (e.g. water) using such systems.

BACKGROUND OF THE INVENTION

Cavitation involves the formation of vapor bubbles in a liquid in a region where the pressure of the liquid falls below its vapor pressure. Cavitation is usually divided into two classes of behavior: inertial (or transient) cavitation, and non-inertial cavitation. Inertial cavitation is the process where a void or bubble in a liquid rapidly collapses, producing a shock wave. Such cavitation often occurs in control valves, pumps, propellers, impellers, and in the vascular tissues of plants. Since the shock waves formed by inertial cavitation are strong enough to significantly damage moving parts, cavitation is in many situations considered to be an undesirable phenomenon. It is specifically avoided or mitigated in the design of machines such as turbines or propellers, and eliminating cavitation is a major field in the study of fluid dynamics.

In certain conditions, the rapid collapse of the vapor bubbles heats the interiors of the microscopic bubbles to high temperatures, which can cause the emission of light, significantly, in the ultra-violet range (see, Putterman "Sonoluminescence: Sound into Light" (February 1995) Scientific American 32); and can initiate chemical reactions, notably oxidation-reduction reactions. It has been found that cavitation can be used to treat water (e.g.: U.S. Pat. No. 5,432,756; "Zebra mussel (*Dreissena polymorpha*) and other aquatic organism control", Bryden, 11 Jul. 1995; and Karpel Vel Leitner et al., "Generation of active entities by the pulsed arc electrohydraulic discharge system and application to removal of atrazine" (2005) 39 Water Research 4705).

In addition to cavitation caused by mechanical/physical agitation, cavitation can be induced with acoustic systems and electrohydraulic discharge systems.

Electrohydraulic discharge systems, also referred to as "sparkers" and "plasma guns", were originally developed for use as a high-energy underwater acoustic source for ocean sub-bottom imaging (e.g., see Canadian Patent 1,268,851, METHOD AND APPARATUS FOR GENERATING UNDERWATER ACOUSTICS. Clements et a., 8 May 1990). The arc created between submersed electrodes, powered by a main capacitor bank, forms a steam/plasma bubble. This bubble launches a powerful acoustic pulse that can penetrate sub-bottom strata. The pressure pulse has the required intensity and wide sonic bandwidth to allow detection of return sound echoes for acoustic sub-bottom imaging.

Some of the prior-art electrohydraulic discharge systems utilize fixed opposed underwater electrodes. As the electrode material tends to be consumed with each arc discharge, this configuration only allows for short operating times before electrode replacement. As well, consumption of the fixed electrodes alters the acoustic pulse intensity and the acoustic source pulse width characteristics. As a result, electrohydraulic discharge systems with fixed electrodes provide changing output or inconsistent characteristics and thus variable effectiveness, efficiency and efficacy when applied as a pulse shockwave source generator for inducing cavitation in liquids as a means of treating the liquids.

U.S. Pat. No. 5,432,756, Bryden discloses electrohydraulic discharge systems utilizing aluminum or aluminum alloy electrodes in the form of aluminum wire drawn from a spool and a feed mechanism comprising cooperating drive wheels. Feeding electrodes and such feed mechanisms are well known in the metal fabrication industry, for example, robotic electrode-motor-feed arc welders. With such welding applications, the electrode material is relatively rapidly consumed and minor imperfections in the electrode-end geometry are essentially self correcting. By contrast, the electrodes in an electrohydraulic discharge system are more slowly consumed and it has been found that the known feeding-electrode systems often produce persistent distortions in the electrode-end geometry (for example, it is not uncommon for the electrode ends to assume a wedge or chisel shape) reducing their arc generation effectiveness.

The known power systems for electrohydraulic discharge systems suitable for use in water treatment, typically comprise a storage circuit (e.g. a capacitor or capacitor bank), connected to: a charger (e.g. a step up transformer and rectifier assembly, conventionally connected to a 120/240 volt mains supply); and, in series with the arc generating electrodes, a high voltage-high current switch (e.g., a conventional air gap switch).

The storage circuits used in electrohydraulic discharge systems suitable for use in water treatment preferably have a capacity as high as possible. Cryogenically cooled superconducting field coils have been suggested (U.S. Pat. No. 5,432,756, Bryden), but the known electrohydraulic discharge systems have utilized capacitors. The standard prior-art type of high voltage capacitors used for high-energy pulse power applications are constructed with two aluminum foil separator dielectrics, consisting of oils, films and papers. These components are wound into spools with each isolated foil extended past both ends of the cartridge assembly. The inside top terminal connections are made to the top and bottom of the cartridge. This is accomplished by a connecting solder terminal wire or bus bar, heated to a molten state in order to flow over and work between the extended layers. This foil connection method is the accepted standard for oil capacitor assemblies. The multi contacts established across the ends of the cartridge produces low inductive losses for the capacitor, but this foil-connection configuration is labour intensive to manufacture and does not provide an ideal foil connection in that solder does not adhere well to aluminum.

SUMMARY OF THE INVENTION

In one aspect, the present invention provides an improved liquid arc induced cavitation (LAIC) system for the treatment of liquids.

In another aspect, the present invention provides an apparatus for use with consumable electrodes for acoustically inducing transient plasma-containing cavitation bubbles in a liquid via an intermittent electric arc, the apparatus including: a feed mechanism for use with a consumable feed electrode having a longitudinal axis, a proximal portion and a distal end with a desired geometry, the feed mechanism configured for connecting to the proximal portion of the feed electrode and selectively moving the feed electrode longitudinally; a rotating mechanism for use with a consumable rotating electrode having a longitudinal axis, a proximal portion and a distal end with a desired geometry, the rotating mechanism configured for connecting to the proximal end of the rotating electrode and selectively rotating the rotating electrode about its longitudinal axis; and the feed mechanism and rotating mechanism configured to position the distal end of the feed electrode in the vicinity of the distal end of the rotating electrode, with the longitudinal axis of the feed electrode generally aligned with the longitudinal axis of the rotating electrode; a power supply assembly electrically connected between the feed mechanism and the rotating mechanism, for, in use, intermittently inducing an electric arc between the distal end of the feed electrode and the distal end of the rotating electrode; wherein, in use, the distal end of the feed electrode and distal end of the rotating electrode are immersed in a liquid with the distal ends spaced one from the other and an intermittent electric arc is induced between the distal ends of the feed electrode and rotating electrode; and the feed mechanism moves the feed electrode to adjust for consumption of the feed electrode and rotating electrode, and the rotating mechanism rotates the rotating electrode to impede arc-related distortion of the geometry of the distal ends of the feed electrode and rotating electrode.

The power supply assembly may include: a capacitor bank comprising a plurality of interconnected oil-filled capacitors, each capacitor comprising: one or more layers of polyester; one or more layers of paper; one or more layers of aluminum foil, each layer of foil having a thickness of about 35 micrometers and an etched gain of about 1600; the layers spooled about a common center; and a plurality of projecting tabs, each tab cold welded to a layer of foil; a charger for charging the capacitor bank; and a switch assembly electrically connected in line with the capacitor bank, the feed mechanism and the rotating mechanism.

The switch assembly may be configured for use with consumable switch electrodes and the switch assembly may include: a switch feed mechanism for use with a consumable switch feed electrode having a longitudinal axis, a proximal portion and a distal end with a desired geometry, the switch feed mechanism configured for connecting to the proximal portion of the switch feed electrode and selectively moving the switch feed electrode longitudinally; a switch rotating mechanism for use with a consumable switch rotating electrode having a longitudinal axis, a proximal portion and a distal end with a desired geometry, the switch rotating mechanism configured for connecting to the proximal end of the switch rotating electrode and selectively rotating the switch rotating electrode about its longitudinal axis; and the switch feed mechanism and switch rotating mechanism configured to position the distal end of the switch feed electrode in the vicinity of the distal end of the switch rotating electrode, with the longitudinal axis of the switch feed electrode generally aligned with the longitudinal axis of the switch rotating electrode; wherein, in use, the distal end of the switch feed electrode and distal end of the switch rotating electrode are spaced one from the other a distance suitable to provide a desired break-down voltage and when the capacitor bank is sufficiently charged to provide said voltage, current arcs across the space between the distal ends of the switch feed electrode and the switch rotating electrode thus providing current to induce the arc between the distal end of the feed electrode and the distal end of the rotating electrode; and the switch feed mechanism moves the switch feed electrode to adjust for consumption of the switch feed electrode and switch rotating electrode, and the switch rotating mechanism rotates the switch rotating electrode to impede arc-related distortion of the geometry of the distal ends of the switch feed electrode and the switch rotating electrode.

The switch assembly may include a switch housing for impeding the intermingling of ambient air with the gas in the vicinity of the distal ends of the switch feed electrode and the switch rotating electrode. The apparatus may include a gas supply device for introducing inert gas within the switch housing.

The power supply assembly may include an arc-control impedance electrically connected in line with the capacitor bank, the feed mechanism, the rotating mechanism and the switch assembly, wherein the impedance is in the range of about 0.2 to about 0.8 ohms or more preferably in the range of about 0.2 to about 0.3 ohms, or even more preferably about 0.2 ohms.

The apparatus may include a reservoir for containing the liquid in which the distal end of the feed electrode and distal end of the rotating electrode are immersed in use, wherein the reservoir includes: a tubular body made from PVC pipe; and two end caps, one end cap affixed to one end of the tubular body and the other end cap affixed to the other end of the tubular body. The end caps are preferably of sufficient density so as to act as acoustic reflectors wherein in use, the reservoir acts as an acoustic cavity resonator. The end caps may be cast iron.

The apparatus may include a microprocessor, connected to and configured to control, the feed mechanism and the rotating mechanism; and sensors for sensing: longitudinal movement of the feed electrode, contact between the feed electrode and rotating electrode, and rotational movement of the rotating electrode, configured to provide sensed information to the microprocessor; wherein, in use, the microprocessor controls the adjustment of the space between the distal ends of the feed electrode and the rotating electrode, and may scour the distal ends of the feed electrode and the rotating electrode by bringing the distal ends into contact and rotating the rotating electrode.

The apparatus may include one or more of: water temperature sensor, water conductivity sensor, acoustic neobate sensor, optical sensor, pH sensor, dissolved gas sensor, particle counter sensor, flow sensor and static pressure sensor, configured to provide sensed information to the microprocessor.

The microprocessor may be connected to and configured to control the switch feed mechanism and the switch rotating mechanism; and the apparatus may include sensors for sensing: longitudinal movement of the switch feed electrode, contact between the switch feed electrode and the switch rotating electrode, and rotational movement of the switch rotating electrode, configured to provide sensed information to the microprocessor; wherein, in use, the microprocessor controls the adjustment of the space between the distal ends of the switch feed electrode and the switch rotating electrode.

The apparatus may include a microwave generator configured to emit microwave pulses into the liquid in which, in use, the distal end of the feed electrode and distal end of the rotating electrode are immersed, the pulses controlled such that each pulse generally coincides with the time period in which plasma subsists in the cavitation bubbles induced by each electric arc. The microwave generator may be configured to produce microwaves in the frequency range of about 1 GHz to about 3 GHz.

The apparatus may include a liquid injection system configured for in use providing liquid having desirable qualities to the vicinity of the distal ends of the feed electrode and rotating electrode.

The apparatus may include a membrane affixed to the interior of the tubular body, for impeding the intermingling of liquid in the vicinity of the distal ends of the feed electrode and rotating electrode, with liquid on the other side of the membrane; and a liquid injection system configured for in use providing liquid having desirable qualities to the vicinity of the distal ends of the feed electrode and rotating electrode.

The electrodes are preferably tempered carbon steel or aluminum, having a diameter of >9.52 mm (⅜ inch), and the switch electrodes are preferably tungsten.

The feed mechanism, rotating mechanism and power supply assembly are preferably located within a Faraday cage.

In another aspect, the present invention provides an apparatus for inducing cavitation bubbles in a liquid via an intermittent electric arc, the apparatus including: a feed electrode, having a longitudinal axis, a proximal portion and a distal end; a rotating electrode, having a longitudinal axis, a proximal portion and a distal end; the feed electrode and rotating electrode positioned with the distal end of the feed electrode in the vicinity of the distal end of the rotating electrode, and with the longitudinal axis of the feed electrode generally aligned with the longitudinal axis of the rotating electrode; a feed mechanism connected to the proximal portion of the feed electrode and configured to selectively move the feed electrode longitudinally; a rotating mechanism connected to the proximal portion of the rotating electrode and configured to selectively rotate the rotating electrode about its longitudinal axis; and a power supply assembly electrically connected between the proximal portion of the feed electrode and the proximal portion of the rotating electrode, for intermittently inducing an electric arc between the distal end of the feed electrode and the distal end of the rotating electrode; wherein, in use, the distal end of the feed electrode and distal end of the rotating electrode are immersed in a liquid with the distal ends spaced one from the other and an intermittent electric arc is induced between the distal ends; and the feed mechanism moves the feed electrode to adjust for arc-related consumption of the feed electrode and rotating electrode, and the rotating mechanism rotates the rotating electrode to impede arc-related distortion of the geometry of the distal ends.

In another aspect, the present invention provides a power supply assembly suitable for use with any electrohydraulic discharge system, the power supply assembly including an oil-filled capacitor or a capacitor bank comprising a plurality of interconnected oil-filled capacitors, each capacitor comprising: one or more layers of polyester; one or more layers of paper; one or more layers of aluminum foil, each layer of foil having a thickness of about 35 micrometers and an etched gain of about 1600; the layers spooled about a common center; and a plurality of projecting tabs, each tab cold welded to a layer of foil.

In another aspect the invention provides an apparatus including an electrohydraulic discharge system for creating intermittent electric arcs in a liquid so as to generate transient plasma-containing cavitation bubbles in the liquid; and a microwave generator configured to emit microwave pulses into the relevant liquid, the pulses controlled such that each pulse generally coincides with the time period in which plasma subsists in the cavitation bubbles. The microwave generator may be configured to produce microwaves in the frequency range of about 1 GHz to about 3 GHz.

In another aspect, the present invention provides for a method for creating carbon nanofibres, the method including the steps of: introducing into a reservoir a water solution containing dissolved pure carbon dioxide or carbon monoxide; inducing transient plasma-containing cavitation bubbles in the solution via intermittent electric arcs generated by an electrohydraulic discharge system. The method may include the step of emitting microwave pulses into the liquid, such that each pulse generally coincides with the time period in which plasma subsists in the cavitation bubbles induced by each electric arc. The microwaves may be in the frequency range of about 1 GHz to about 3 GHz.

SUMMARY OF THE DRAWINGS

FIG. 9 is a schematic perspective representation of a LAIC system embodiment of the present invention suitable for water treatment having a solution feed assembly.

FIG. 10 is a schematic partially transparent perspective representation of a LAIC system embodiment of the present invention suitable for water treatment having a solution feed assembly and a flexible membrane.

FIG. 11 is a perspective view showing a LAIC system embodiment of the present invention suitable for water treatment, having a magnetron.

DETAILED DESCRIPTION WITH REFERENCE TO THE DRAWINGS

A liquid arc induced cavitation (LAIC) system 20 embodiment of the present invention is shown in the Figures.

Figure 1:
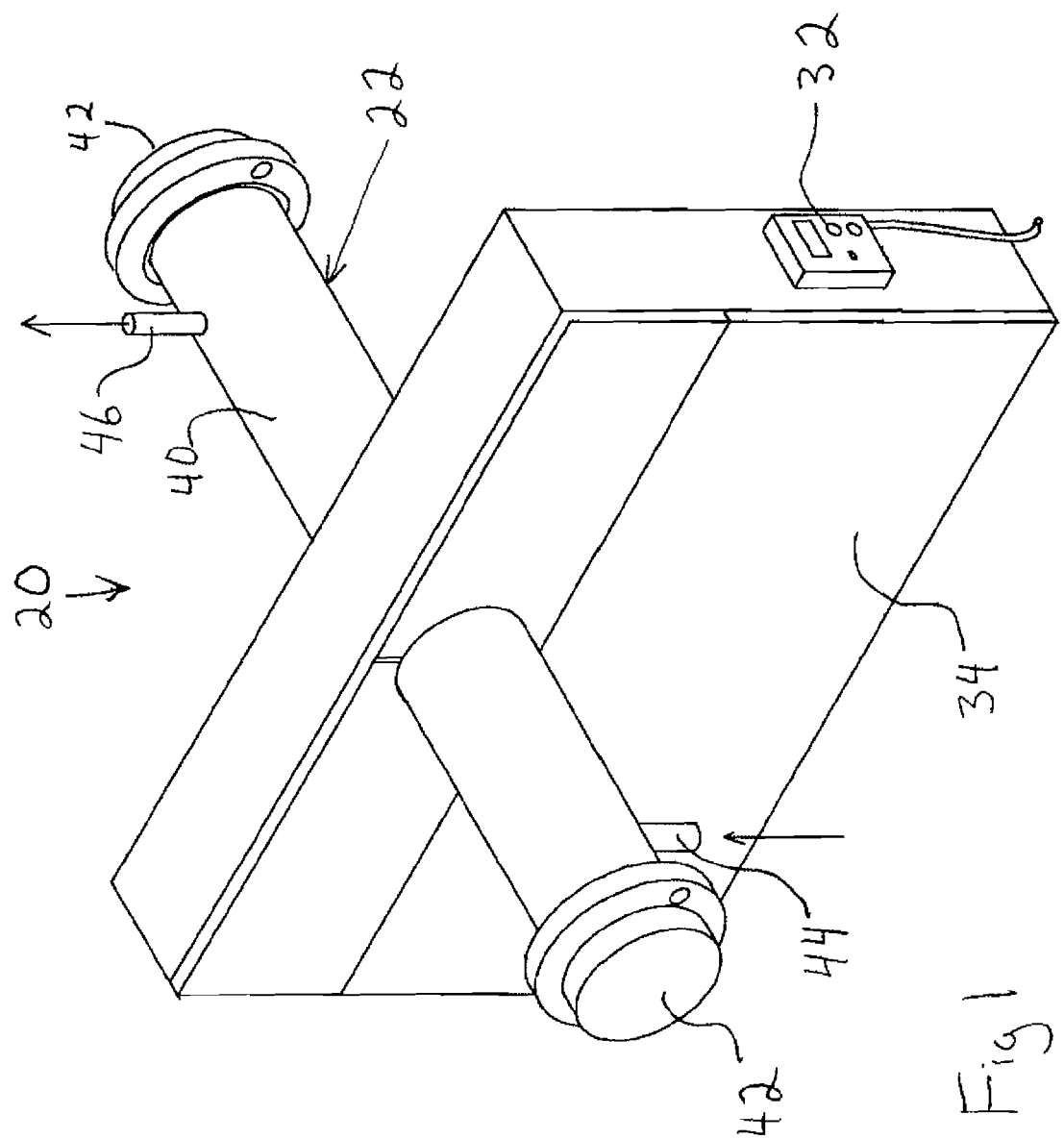
FIG. 1 is a perspective view showing a liquid arc induced cavitation (LAIC) system embodiment of the present invention suitable for water treatment.
Figure 2:
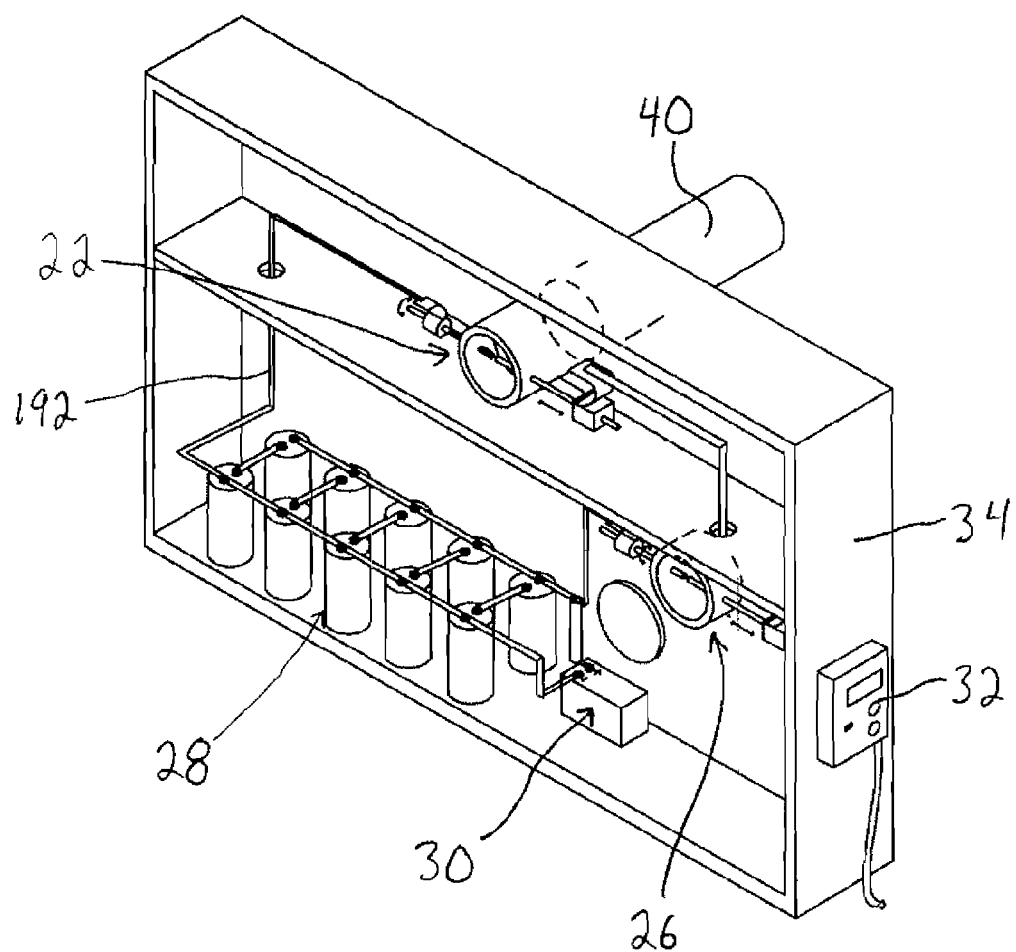
FIG. 2 is a partially cutaway, partially exploded perspective view of the LAIC system embodiment of FIG. 1.

As shown in FIGS. 1 and 2, the LAIC system 20 includes a liquid reservoir 22, an arc electrode assembly 24, a spark gap switch assembly 26, a capacitor bank 28, a charger 30, a power/control unit 32 and a housing 34.

The reservoir 22 comprises a tubular body 40 with end caps 42, an inlet 44, an outlet 46 and two electrode orifices 48. Conveniently, the tubular body 40 may be standard plastic PVC water main pipe. The end caps 42 may be standard high-density cast-iron pipe caps; such cast-iron pipe caps act as effective acoustic reflectors, which allows the reservoir 22 to act as an acoustic cavity resonator. A predetermined length of the plastic pipe can be cut for a specific application for best mode of operation.

In FIG. 1, arrows in the vicinity of the inlet 44 and outlet 46 indicate direction of flow, but the flow of liquid through the reservoir 22 need not be as indicated. That is, although it is preferable for the inlet 44 and outlet 46 to be displaced one from the other and thus to be located in the vicinity of opposite ends of the reservoir 22, each of the inlet 44 and outlet 46 could be located as desired by the user.

The operation of the LAIC system 20 will over time tend to cause erosion of the inner walls of the reservoir 22 (due to the release of oxidation-reduction species and the micro plasmas created at the centre of each cavitating bubble in contact with the inner walls of the reservoir 22, as explained in greater detail below). PVC pipe is resilient to this effect and can be used for a relatively extended period of time before the pipe may need replacing. However it may be desirable to insert a sacrificial sleeve (not shown) on the inside of the reservoir 22 so as to extend the service life of the tubular body 40. Such a sacrificial sleeve would have suitable holes aligned with the inlet 44, outlet 46 and electrode orifices 48, and might be in two half sections to facilitate installation and replacement.

Figure 3:
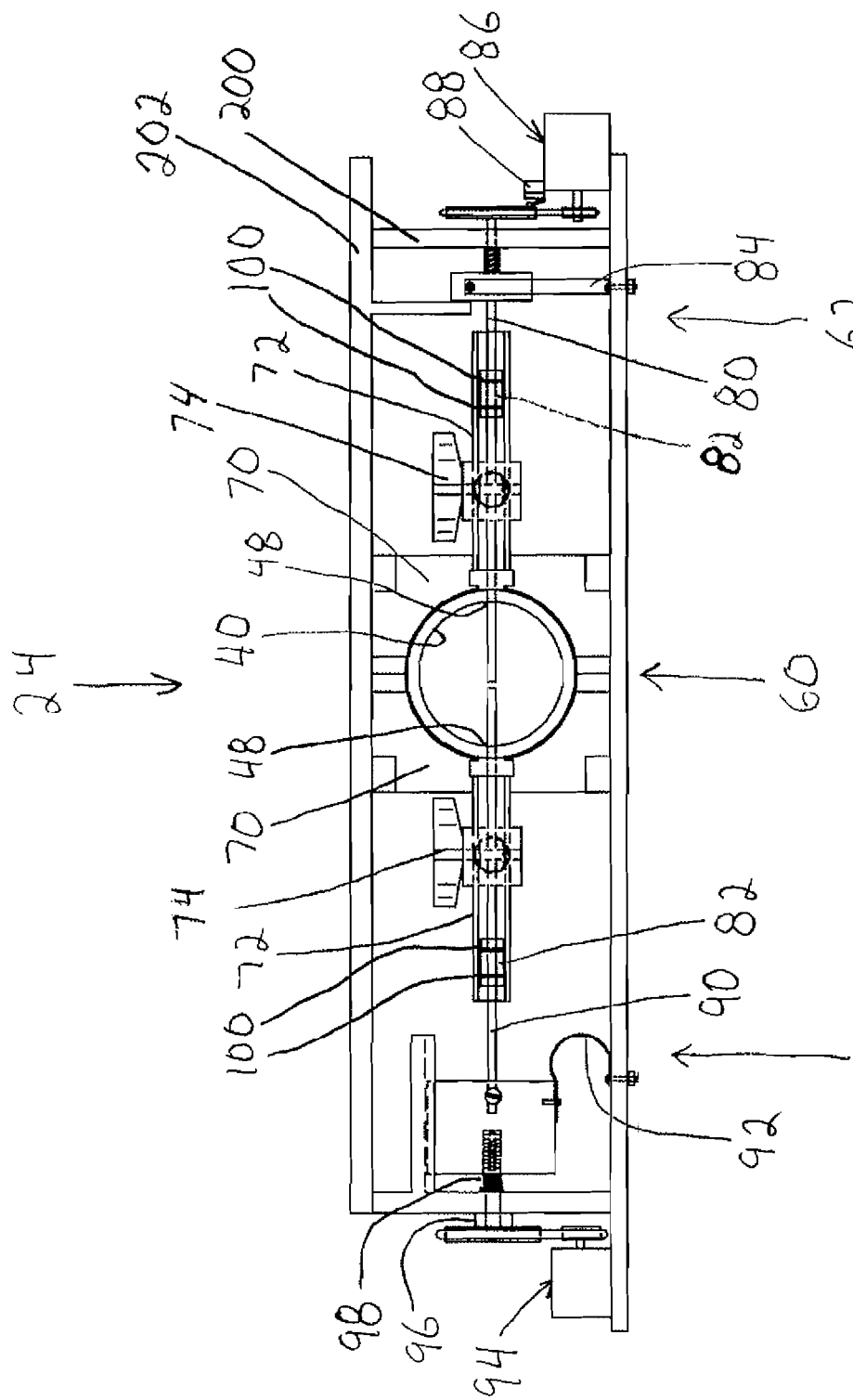
FIG. 3 is a partially cutaway isolation elevation view showing the arc electrode assembly of the embodiment of FIG. 1.

As indicated in FIGS. 2 and 3, the arc electrode assembly 24 includes: a saddle assembly 60, a rotating-electrode assembly 62 and a feed-electrode assembly 64.

The saddle assembly 60 includes two saddles 70 and, attached to each saddle 70, a draw sleeve 72 having an inline valve 74. The saddle assembly 60 is preferably made from plastic so as to electrically isolate the rotating-electrode assembly 62 and feed-electrode assembly 64. Preferably, four nylon nuts and bolts (not shown) are used to secure the saddles 70 one to the other about the tubular body 40. In use, the nuts and bolts can be adjusted to align the positions of the electrodes; such fine adjustments can compensate for the plastic pipe's imperfections. The saddles 70 can be fitted with an initial installation electrode-alignment jig and dowels (not shown) to provide alignment during drilling of the electrode orifices 48.

The rotating-electrode assembly 62 includes a rotating electrode 80, a draw-sleeve seal 82, a rotation electrical connector 84, a rotation drive mechanism 86 and a rotation position sensor 88.

The feed-electrode assembly 64 includes a feed electrode 90, a draw-sleeve seal 82, a feed electrical connector 92, a feed drive mechanism 94, a feed sensor 96 and a pressure sensor 98.

The rotating electrode 80 and feed electrode 90 are preferably made from tempered carbon steel or aluminum. It has been found that electrodes 80, 90 with a diameter of >9.52 mm (⅜ inch) provide an adequate retention of the desired end-of-electrode geometry, with repeated discharges.

Each draw-sleeve seal 82 is releasably affixed about the respective electrode 80, 90 in a manner that impedes the flow of liquid between the electrode 80, 90 and the draw-sleeve seal 82. Each draw-sleeve seal 82 has two external O-rings 100, so as to impede the flow of liquid between the draw-sleeve seal 82 and the respective draw sleeve 72 while permitting rotational or longitudinal movement (as the case may be) of the draw-sleeve seal 82 within the draw sleeve 72.

The rotation electrical connector 84 and feed electrical connector 92 are made from flexible electrically conductive material, sized and configured to permit about 360° reversible rotation of the rotating electrode 80 in the case of the rotation electrical connector 84 and the desired range of reversible longitudinal movement in the case of the feed electrical connector 92.

Figure 4:
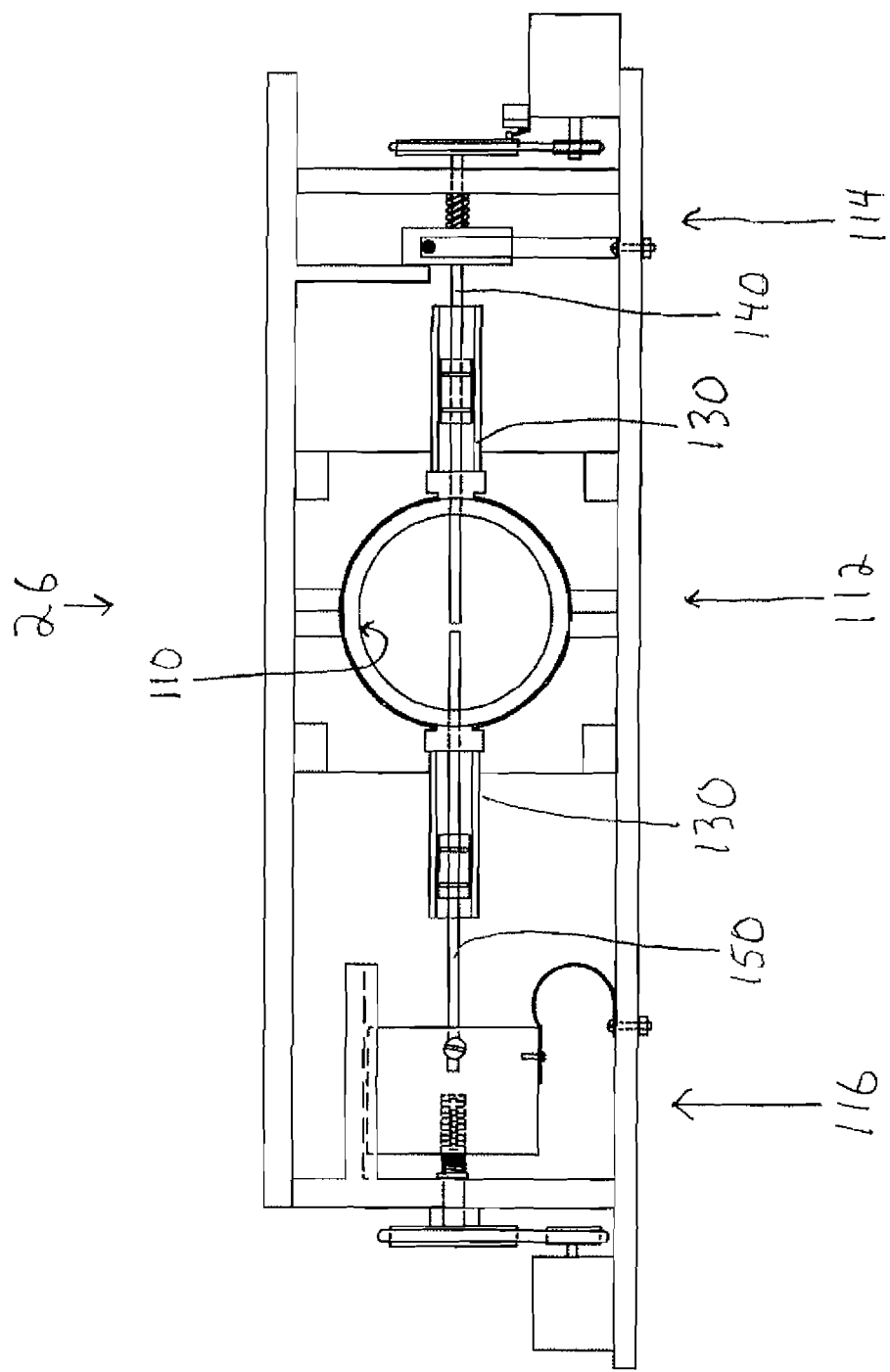
FIG. 4 is a partially cutaway isolation elevation representation of the spark gap switch assembly of the embodiment of FIG. 1.
Figure 5:
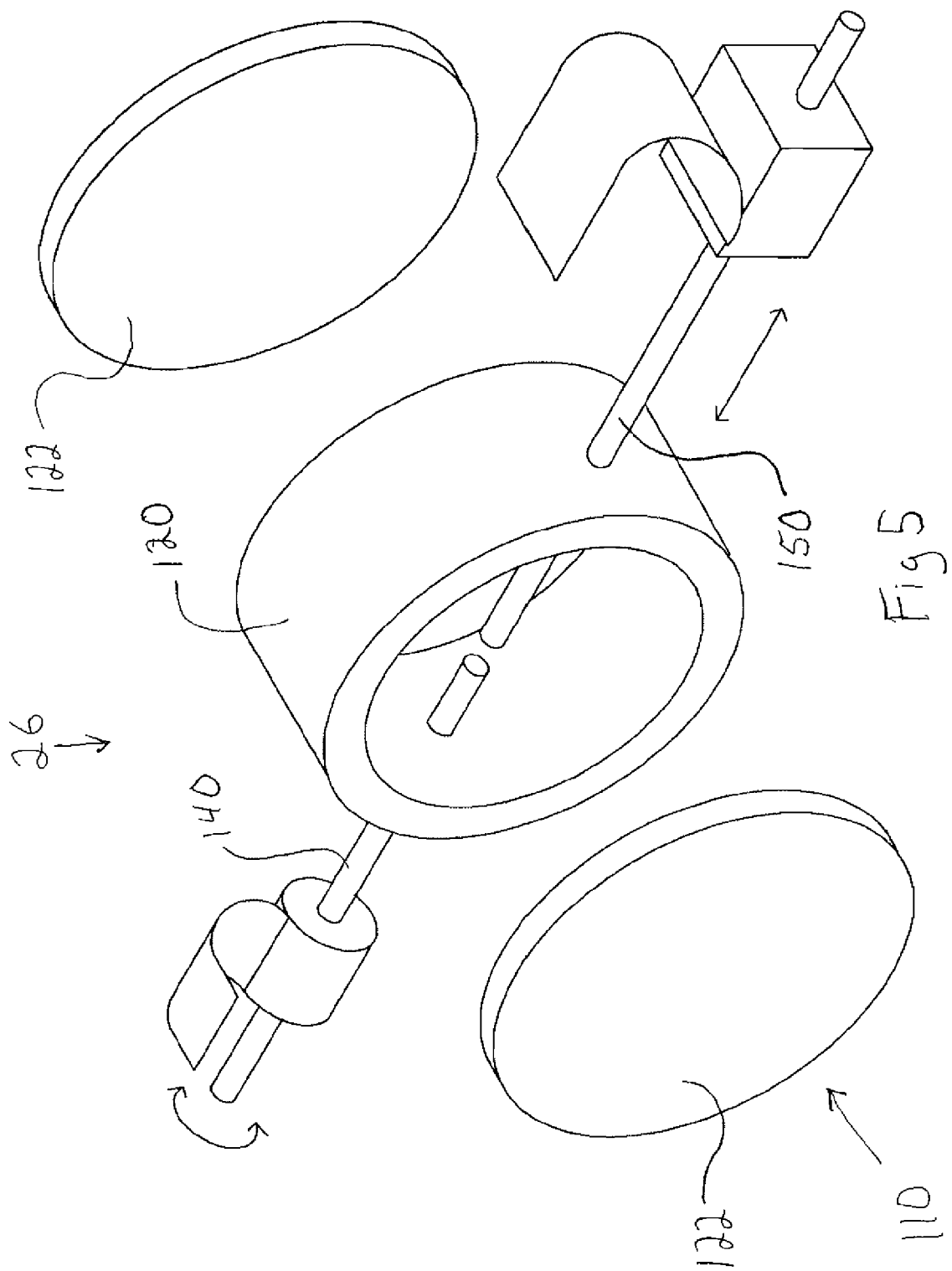
FIG. 5 is a perspective schematic partially exploded representation of components of the spark gap switch assembly shown in FIG. 4.

As indicated in FIGS. 4 and 5, the spark gap switch assembly 26 is, in terms of its general features and operation, similar to the arc electrode assembly 24 and desirably, from the perspective of manufacturing costs, may utilize components identical to some of those in the arc electrode assembly 24, as indicated in what follows, in which features that may be identical as between the spark gap switch assembly 26 and arc electrode assembly 24 are identified in the same manner as used above with respect to the components of the arc electrode assembly 24.

The spark gap switch assembly 26 includes a switch housing 110, switch saddle assembly 112, a switch rotating-electrode assembly 114 and a switch feed-electrode assembly 116.

The switch housing 110 includes an annular body 120 and two end plates 122 affixed to the annular body 120. The annular body 120 is preferably made from a section of pipe of the same diameter as the tubular body 40, and further, from the perspective of cost and ease of manufacture, is preferably made from standard PVC pipe. The end plates 122 are preferably affixed to the annular body so as to provide a fluid-tight seal, so as to contain within the switch housing 110 a gas or gases other than ambient air (for example, an inert gas), should it be desirable to do so.

The switch saddle assembly 112 includes saddles 70 and switch draw sleeves 130. The latter differ from the draw sleeves 72 in that the switch draw sleeves 130 do not have inline valves.

The switch rotating-electrode assembly 114 and switch feed-electrode assembly 116 differ from the rotating-electrode assembly 62 and feed-electrode assembly 64 in that the switch rotating electrode 140 and switch feed electrode 150 are preferably made from tungsten.

As indicated in FIG. 2, the capacitor bank 28 includes ten hybrid capacitors 160 arranged into five in-series pairs with the five pairs connected in parallel.

Figure 6:
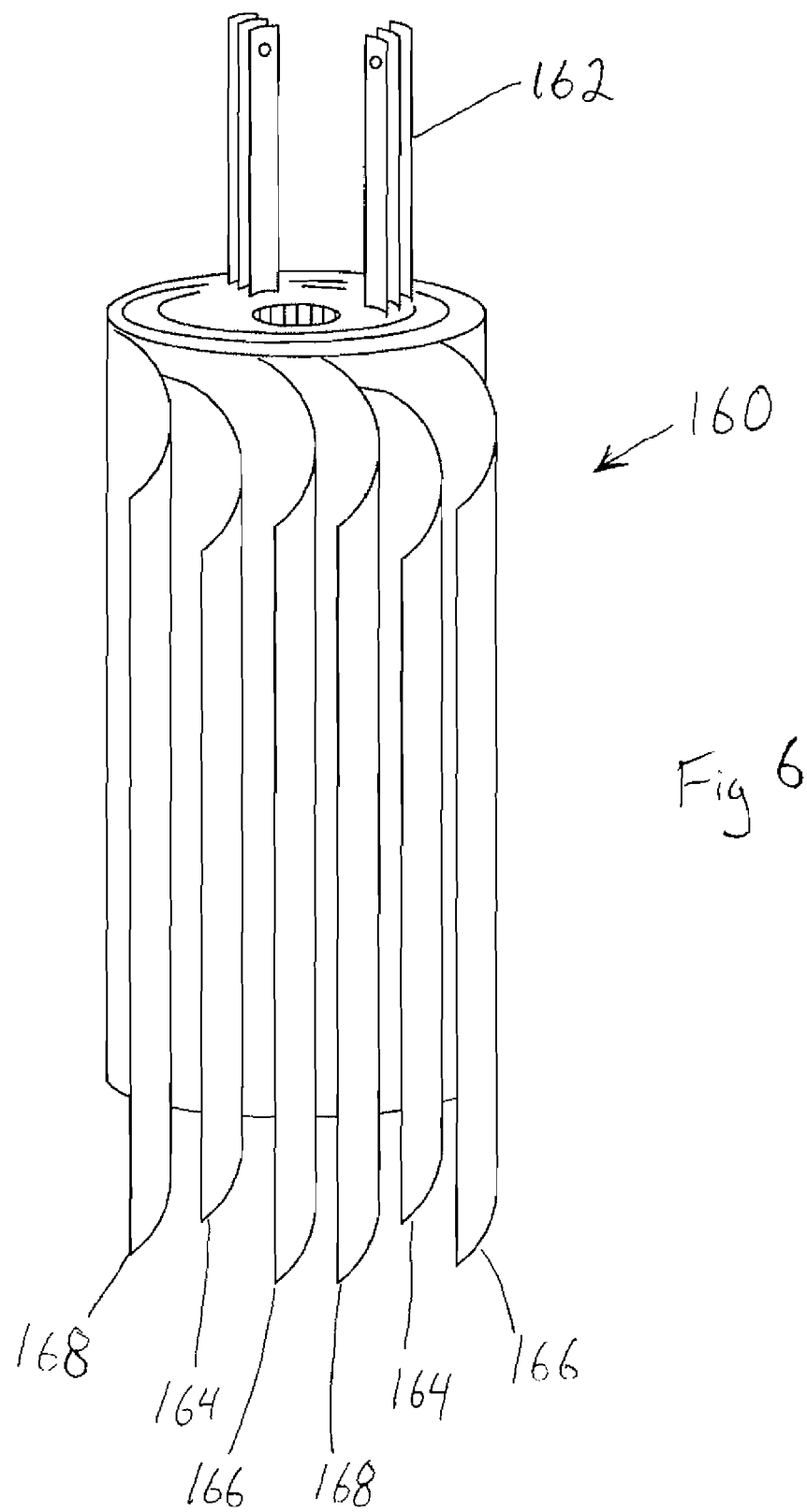
FIG. 6 is a perspective schematic representation of the hybrid capacitor of the embodiment of FIG. 1.

As indicated in FIG. 6, each hybrid capacitor 160 is essentially an oil-filled electrostatic capacitor having features of electrolytic capacitors, that it is understood have not been previously used in electrostatic capacitors.

As represented schematically in FIG. 6, each hybrid capacitor 160 includes: tabs 162, and spooled layers of foil 164, polyester 166 and paper 168

As with typical electrolytic capacitors, the tabs 162 extend through the capacitor assembly. The tabs 162 are connected to the foils 164 with a process called "cold welding", in which a specifically configured tool bit and hydraulic pressure are used to crush the respective tab 162 and the foil 164 together. Very high pressure is used to form a positive connection. This automated connection system is cost efficient and is a common practice in the manufacture of electrolytic capacitors. With this approach, multiple connections of the tabs 162 and foils 164 are reasonably easy to obtain.

As compared to conventional oil-filled electrostatic capacitors with solder connections, the multiple connection arrangement of the tabs 162 and foils 164 realizes a higher inductance that is beneficial in the LAIC system embodiments described herein in that it can be used to assist in critically damping the energy discharge from the capacitor bank 28, as part of a discharge current pulse forming circuit. The hybrid capacitors 160 can be configured to in part function as integral part of a RLC circuit pulse-forming arrangement. The hybrid capacitors 160 can be wound with a planned capacitance inductive rating. Such hybrid capacitors 160 act as a dual-function component: an energy storage device as well as an element for a critically damp pulse forming circuit.

Lighter gauge aluminum foils with smooth surfaces are typically used in standard oil electrostatic capacitors. The foils used for electrolytic capacitors have etched surfaces. A polarized electrolytic capacitor uses two types of foils, an oxide formed etched anode foil and a cathode etched foil with little or no formed surface oxide. It has been found that energy storage improves if etched foil is used in oil-filled electrostatic capacitors, rather than the standard non-etched foil. Use of etched foil for both capacitor plates provides an increase surface area for a net increase in capacitance, referred to as foil gain. A hybrid capacitor 160 with etched foils would be expected to realize a capacitance gain in the order of >2 times. It is understood that the use of cathode-etched foil would be more cost effective and more efficient as compared to lighter gauge non-etched foils. Preferably, the foils 164 have a thickness of about 35 micrometers and an etched gain of 1600.

Thicker etched foils provide an added advantage in current handling capability, when compared with conventional oil-filled capacitors, in that capacitors having the thicker etched foils operate more efficiently when used in this pulse power integrator circuit. The heavier gauge cathode etched foils provide a better heat transfer coefficient and a more robust cartridge assembly offering a longer high current discharge life.

Figure 7:
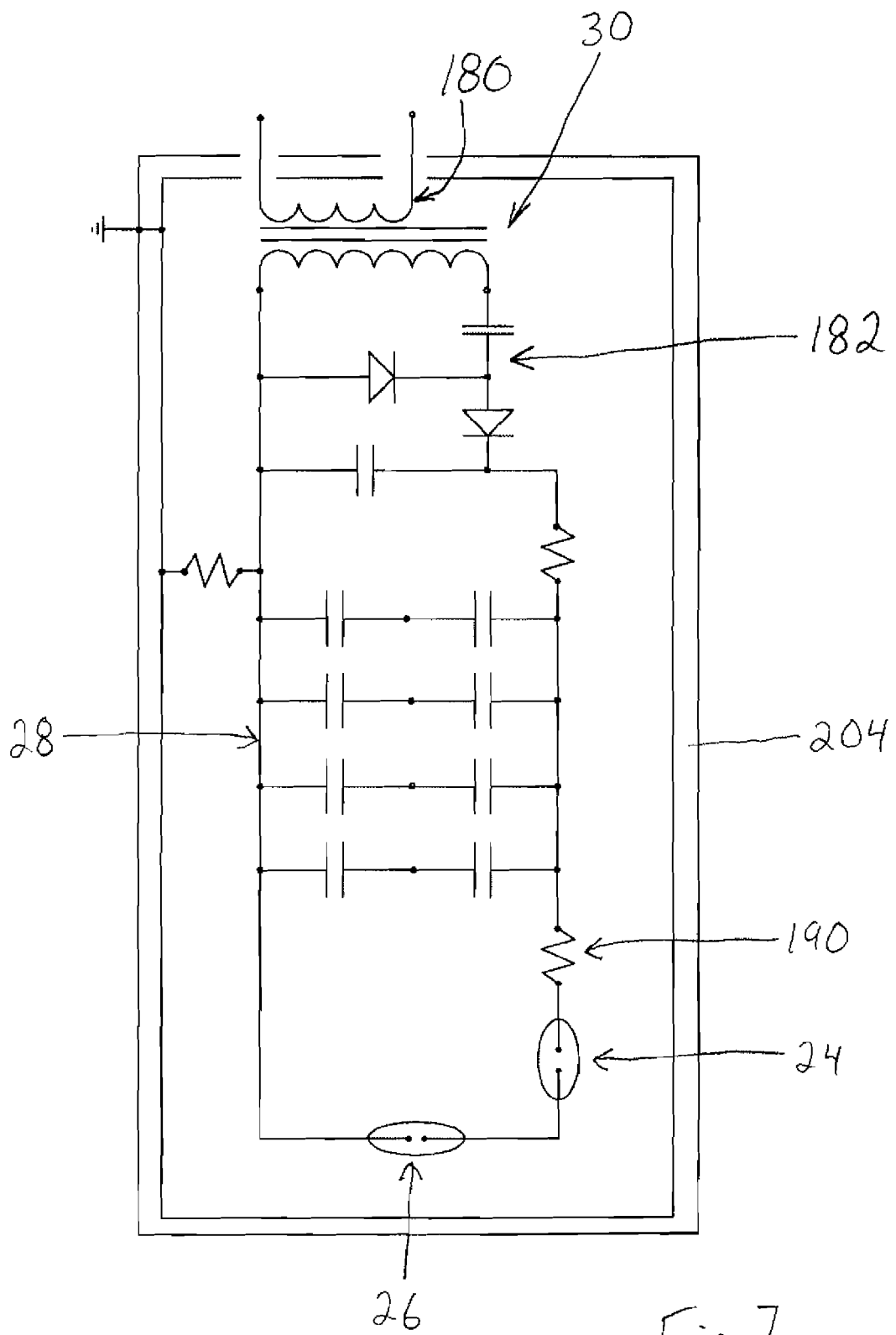
FIG. 7 is a circuit diagram showing the power circuit of the embodiment of FIG. 1.

As indicated in FIG. 7, the charger 30 includes conventional charger components, including a step-up transformer 180 and rectifier circuit 182.

As indicated in FIG. 7, the power circuit includes resistance (referred to herein as the arc-control impedance 190) in series with the arc electrode assembly 24, spark gap switch assembly 26 and capacitor bank 28. It has been found that without some impedance in the power circuit, the arc generated by the arc electrode assembly 24 is of shorter duration and hotter than desirable in that the resulting steam bubble is also of a shorter than desired duration, which tends to produce a cloud of smaller than desired cavitation bubbles in the vicinity of the electrodes 80, 90 rather than cavitation bubbles dispersed within the reservoir 22. Such a cloud of cavitation bubbles tends to be affected by what is referred to as bubble resonance, which adversely affects the propagation in the reservoir of the shock wave created by the arc-induced steam bubble. It has also been found that the impedance in the power circuit can also be too high, with the result that the arc-induced steam bubble lasts longer than desired and is not as hot as desired, resulting in a shock wave that produces fewer and larger cavitation bubbles. Larger cavitation bubbles are less effective at producing the desired internal temperatures on collapse.

It has been found that the arc-control impedance 190 is adequately functional if it has an impedance in the range of 0.2 to 0.8 ohms, more desirably has an impedance in the range of 0.2 to 0.3 ohms and optimally has an impedance of about 0.2 ohms. The arc-control impedance 190 is preferably provided by a section of nichrome wire 192.

The power/control unit 32 includes a general power switch (not indicated in the drawings) for the liquid arc induced cavitation (LAIC) system 20 and a microprocessor (not indicated in the drawings) connected to, and for controlling, the arc electrode assembly 24 and spark gap switch assembly 26.

The housing 34 includes a frame 200 and removable shielding panels 202. The shielding panels 202 are double shielded and the housing 34 acts as a Faraday cage 204. The arc electrode assembly 24, spark gap switch assembly 26, capacitor bank 28 and charger 30, are mounted to and contained within the housing 34. This configuration eliminates the need for remote shielded high voltage transmission cables, thus keeping the whole system contained as one unit. The reservoir 22 extends through the housing 34. The power/control unit 32 is mounted to the exterior of the housing 34.

In use, with liquid in the reservoir 22 and the LAIC system 20 connected to a standard 12V or 240V AC service line, and turned on, the charger 30 charges the capacitor bank 28 at a desired/programmed algorithm interval. When the breakdown voltage of the spark gap switch assembly 26 is achieved, the series circuit between the capacitor bank 28 and the arc electrode assembly 24 becomes closed, permitting the discharge of the energy stored in the capacitor bank 28 via the arc electrode assembly 24. The discharge high voltage potential breaks down and spontaneously creates an ionized arc channel between the opposing rotating electrode 80 and feed electrode 90. This arc channel rapidly heats the liquid in the immediate vicinity of the gap between electrodes 80, 90. A rapidly growing and collapsing, that is, oscillating steam bubble results, causing a series of pressure shockwaves that induce cavitation in the surrounding liquid.

Distortion of the end-of-electrode geometry that occurs with the known feeding electrode systems, is avoided or significantly reduced in the LAIC system 20 in both the arc electrode assembly 24 and spark gap switch assembly 26, through the reversible rotation of the rotating electrode 80 and switch rotating electrode 140 respectively.

For each of the arc electrode assembly 24 and spark gap switch assembly 26, a periodic positioning calibration routine is used to keep track of electrode positioning and electrode gap, as the electrodes 80, 90 and 140, 150, are consumed. For illustrative purposes, in what follows, the routine is described with respect to the arc electrode assembly 24. A set-up program algorithm periodically advances the feed electrode 90 until it touches the rotating electrode 80. When contact is made between the electrodes 80, 90, the pressure sensor 98 sends a signal to the microprocessor in the power/control unit 32. On receiving the signal from the pressure sensor 98, the program sets a variable state used to calibrate initial electrode position. The feed electrode 90 is then withdrawn to a new set (i.e., understood to be optimal for the operation parameters then pertaining) position determined by the control program algorithm based on information provided by the feed sensor 96, which may be based on the number of motor rotations known to provide a specified longitudinal movement of the fee electrode 90.

Testing determined that this dynamic automated adjustment method by controlling the underwater gap, compared to sparker prior art, provides a more efficient energy transfer for the controlled production of OH radicals indicated by a higher rate of change of liquid ph. The pressure wave can be tuned, effectively increasing the intensity and wave shape. This tuning affects, in a controlled way, the size and distribution of the cavitating bubbles in the liquid in the reservoir 22.

The calibration program algorithm used with the spark gap switch assembly 26 is similar to that for the arc electrode assembly 24. The higher melting temperature of tungsten allows for longer operating periods before it is necessary to run the reset gap calibration program algorithm routine. The system operation program algorithm determines the best period for the cyclic charge/discharge operation. The microprocessor switch program algorithm uses information from sensors indicating the charging rate of the capacitor bank 28. This charging rate determines the appropriate period of time between each successive arc generated liquid pulse.

With sustained operation with water having a high concentration of dissolved salts, deposits may form on the electrodes 80, 90, which can reduce the water gap spacing in an uncontrolled way. In addition, this buildup reduces the efficiency of the LAIC system 20 due to the higher dielectric properties of the salt deposits. The optimum gap space is one that is as large as possible while still producing an arc. A program algorithm can be used to periodically remove buildup from the ends of the electrodes 80, 90, by bringing the ends of the electrodes 80, 90 into contact, one with the other and then repeatedly reversibly rotating the rotating electrode 80 so as to scour the ends of the electrodes 80, 90.

The electrodes 80, 90 and 140, 150 are replaced when they have been consumed back past the point where the relevant assembly can no longer maintain the desired gap.

In the case of the arc electrode assembly 24, the valves 74 permit the electrodes 80, 90 to be replaced while liquid is in the reservoir 22, with only minimal loss of liquid via the electrode orifices 48 and draw sleeves 72. The relevant valve 74 can then be closed once the electrode 80, 90 is drawn back out the way of the valve mechanism. Thus is should not be necessary to drain the reservoir 22 during replacement of the electrodes 80, 90. It will be apparent that if the draw sleeves 72 were long enough to permit closing of the valve 74 while the draw-sleeve seal 82 is still within the draw sleeve 72, then even less liquid would be lost. However, this would presumably require a larger housing 34 which would be undesirable for many applications.

The power circuit includes the capacitor bank 28 series connected to a RCL integrator circuit. Preferably, one or more of the inductive elements comprising the integrator circuit has a motor driven moving core. A microprocessor integrator program algorithm using feedback sensors to optimize efficient energy transfer of the main discharge integrator circuit may be used to adjust the core's lateral position inside the tuning inductor.

Figure 8:
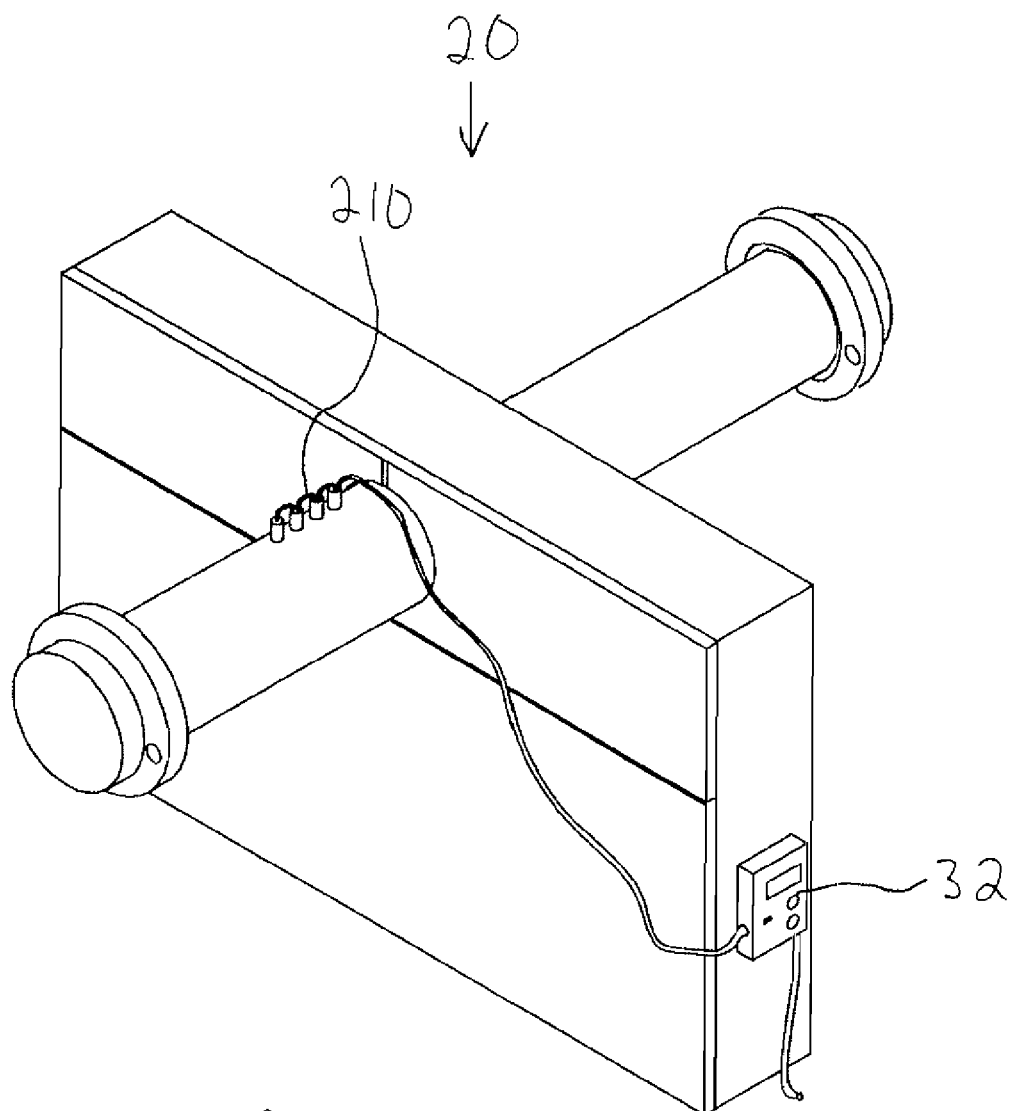
FIG. 8 is a is a perspective view of the embodiment of FIG. 1 showing the power/control unit connected to sensors mounted to the reservoir.

As indicated in FIG. 8, operation of the LAIC system 20 can be enhanced by adding different types of feedback sensors 210. For example, such added sensors may provide information to help optimize liquid gap adjustments or the power settings, and may be used to indicate when the required liquid treatment is complete. Examples of sensors that may be connected to the power/control unit 32 include: motor optical positioning sensors, water temperature sensor, water conductivity sensor, acoustic neobate sensor, optical sensor, pH sensor, dissolved gas sensor, particle counter sensor, flow sensor and static pressure sensor. Such sensors facilitate computer modeling, real-time analysis and data logging.

The operating dosage of the LAIC system 20 necessary to obtain a desired degree of treatment could be evaluated in terms of a peak pressure level, characteristic tuning of the slope of the pulse, pH change per unit volume, the period between each pulse, the change of turbidity and the liquid dwell time for repeated pulses.

A self-learning program algorithm could optimize operation automatically on the basis of data received from sensors. Alternatively, the program operating variables could be changed manually, by an operator, to accommodate different operating conditions.

The electrical liquid treatment provided by the LAIC system 20 forms a pulsed shockwave to generate characterized cavitation in the surrounding liquid medium. The cavitating liquid provides the ionization potential to induce oxidation reduction chemical reactions, precipitate salts out of solutions, break up of colloids and kill most types of living organisms. The dynamic control of the cavitating hydraulic properties of liquids enable an efficient means to treat a given volume of liquids in a standard plastic water main pipe resonator.

A test was conducted by bubbling carbon dioxide gas while the LAIC system 20 operated at >100 joules per pulse. The test run formed carbon particles in suspension. This formation of carbon particles indicates that there is sufficient heat at the centre of each collapsing cavitation bubble to form elemental carbon. This mode of operating enables the efficient production in the reactor of carbon particles while at the same time recovering waste carbon dioxide gas.

The efficiency of the LAIC system 20, in terms of treatment of water, is affected by the water's pH. The higher the pH above 7 the more scavenger molecules are available in the water to combined with the free oxygen radical atoms produced in the water. With high alkaline water, the number of pulses and energy per pulse (i.e. the dose level) typically must be increased as compared to operation in neutral pH water. A program algorithm using information from a sensor monitoring pH would increase the dose level as required to treat high alkaline water.

As an alternative, to improve the effectiveness of the LAIC system 20 when used with alkaline water, as shown in FIG. 9, a liquid injection system 220 (for injecting a saline water solution or other suitable liquid) could be used. The liquid injection system 220 includes a tank 222, pump 224, a bored electrode 226, and connecting tubes 228. The arc in the saline water solution would optimize the shockwave and provide consistent operation.

As a further alternative, to improve the effectiveness of the LAIC system 20 when used with alkaline water, as shown in FIG. 10, a flexible membrane 230 may be installed inside the reservoir 22 to impede mixing of the liquid in the vicinity of the electrodes 80, 90 with other liquid (e.g. high alkaline water) in the majority of the reservoir 22. The liquid in the vicinity of the electrodes 80, 90 could be provided via an orifice in the reservoir 22 (not shown) or as shown in FIG. 10 via a liquid injection system 220 as described above. The optimized shockwave achieved thereby propagates through the flexible membrane 230.

A magnetron 240 may be installed as indicated in FIG. 11. When the LAIC system is operational, the plasma within the cavitation bubbles will absorb radio frequency energy due to its ionization state. For such an arrangement, the magnetron 240 is tuned to the microwave water hole frequencies at 1 to 3 GHz and the reservoir 22 is preferably configured and sized to be a cavity resonator operating at the tuned frequency of the magnetron 240. As indicated in FIG. 11, the antenna of the magnetron 240 is inserted into the reservoir 22 so as to couple the oscillator's energy to the water. As is conventional with a magnetron 240, a section of the reservoir 22 in the vicinity of the oscillator is within an annular shield 242. The annular shield 242 comprises a double shield separated by a dielectric suitable for the water hole frequencies.

The magnetron 240 is controlled (e.g. by the microprocessor in the power/control unit 32) so that the timing of the magnetron oscillator coincides with the timing of the arc discharge and the magnetron oscillator stays activated for the duration of the cavitation bubbles, which is typically approximately 60 milliseconds. As the magnetron 240 only operates intermittently and for short periods, it can operate at higher energies (i.e., operating voltage) than can generally be used with similar magnetrons in conventional applications.

It has been found that the cavitation bubble energy increase provided by the magnetron 240 improves the rate of carbon nanofibers production when used with a pure water solution containing dissolved pure carbon dioxide or carbon monoxide. In such use, the carbon nanofibers are filtered from the water solution and tested to determine the length of time that delivers the best carbon quality result. This carbon nanofibre process can be automated by the control algorithms used in the microcontroller. Other frequencies can be utilized to further enhance the carbon fibre quality, e.g., resonate radio frequency of carbon molecules found in the microwave frequency range.

The footprint of the housing 34 is relatively small and narrow. This configuration and the perpendicular orientation of the housing 34 relative to reservoir 22, means that multiple LAIC units could be positioned side by side along a length of pipe. Such a multiple unit configuration enables the creation of successive pulse standing waves in the pipe. A standing superposition wave can be created and controlled to sweep back and forth, along the length of a pipe. A microprocessor discharge-timing algorithm, using feedback acoustic sensors, can accomplish this by timing the controlled discharge, of two or more LAIC units.

Treatment of water in continuous flow conditions may if the flow rate is low, be accomplished with a single LAIC system 20. In higher flow conditions, an array of LAIC systems 20 arranged in series, in parallel or in both series and parallel may be used. Operation of multiple LAIC systems 20 may be coordinated by a single microprocessor receiving operational and treatment information from the LAIC systems 20.

What is claimed is:

1. An apparatus for use with consumable electrodes for acoustically inducing transient plasma-containing cavitation bubbles in a liquid via an intermittent electric arc, the apparatus comprising:
a feed mechanism for use with a consumable feed electrode having a longitudinal axis, a proximal portion and a distal end with a desired geometry, the feed mechanism configured for connecting to the proximal portion of the feed electrode and selectively moving the feed electrode longitudinally;
a rotating mechanism for use with a consumable rotating electrode having a longitudinal axis, a proximal portion and a distal end with a desired geometry, the rotating mechanism configured for connecting to the proximal end of the rotating electrode and selectively rotating the rotating electrode about its longitudinal axis; and
the feed mechanism and rotating mechanism configured to position the distal end of the feed electrode in the vicinity of the distal end of the rotating electrode, with the longitudinal axis of the feed electrode generally aligned with the longitudinal axis of the rotating_electrode;
a power supply assembly electrically connected between the feed mechanism and the rotating mechanism, for, in use, intermittently inducing an electric arc between the distal end of the feed electrode and the distal end of the rotating electrode;
wherein, in use, the distal end of the feed electrode and distal end of the rotating electrode are immersed in a liquid with the distal ends spaced one from the other and an intermittent electric arc is induced between the distal ends of the feed electrode and rotating electrode; and the feed mechanism moves the feed electrode to adjust for consumption of the feed electrode and rotating electrode, and the rotating mechanism rotates the rotating electrode to impede arc-related distortion of the geometry of the distal ends of the feed electrode and rotating electrode; and
a microwave generator configured to emit microwave pulses into the liquid in which, in use, the distal end of the feed electrode and distal end of the rotating electrode are immersed, the pulses controlled such that each pulse generally coincides with the time period in which plasma subsists in the cavitation bubbles induced by each electric arc.

2. The apparatus of claim 1, wherein the power supply assembly comprises:
a capacitor bank comprising a plurality of interconnected oil-filled capacitors, each capacitor comprising:
one or more layers of polyester;
one or more layers of paper;
one or more layers of aluminum foil, each layer of foil having a thickness of about 35 micrometers and an etched gain of about 1600;
the layers spooled about a common center; and
a plurality of projecting tabs, each tab cold welded to one of the layers of foil;
a charger for charging the capacitor bank; and
a switch assembly electrically connected in line with the capacitor bank, the feed mechanism and the rotating mechanism.

3. The apparatus of claim 2, wherein the switch assembly is configured for use with consumable switch electrodes and the switch assembly comprises:
a switch feed mechanism for use with a consumable switch feed electrode having a longitudinal axis, a proximal portion and a distal end with a desired geometry, the switch feed mechanism configured for connecting to the proximal portion of the switch feed electrode and selectively moving the switch feed electrode longitudinally;
a switch rotating mechanism for use with a consumable switch rotating electrode having a longitudinal axis, a proximal portion and a distal end with a desired geometry, the switch rotating mechanism configured for connecting to the proximal end of the switch rotating electrode and selectively rotating the switch rotating electrode about its longitudinal axis; and
the switch feed mechanism and switch rotating mechanism configured to position the distal end of the switch feed electrode in the vicinity of the distal end of the switch rotating electrode, with the longitudinal axis of the switch feed electrode generally aligned with the longitudinal axis of the switch rotating electrode;
wherein, in use, the distal end of the switch feed electrode and distal end of the switch rotating electrode are spaced one from the other a distance suitable to provide a desired break-down voltage and when the capacitor bank is sufficiently charged to provide said voltage, current arcs across the space between the distal ends of the switch feed electrode and the switch rotating electrode thus providing current to induce the arc between the distal end of the feed electrode and the distal end of the rotating electrode; and the switch feed mechanism moves the switch feed electrode to adjust for consumption of the switch feed electrode and switch rotating electrode, and the switch rotating mechanism rotates the switch rotating electrode to impede arc-related distortion of the geometry of the distal ends of the switch feed electrode and the switch rotating electrode.

4. The apparatus of claim 3, wherein the switch assembly further comprises a switch housing for impeding the intermingling of ambient air with the gas in the vicinity of the distal ends of the switch feed electrode and the switch rotating electrode.

5. The apparatus of claim 4, further comprising a gas supply device for introducing inert gas within the switch housing.

6. The apparatus of claim 3 wherein the power supply assembly further comprises an arc-control impedance electrically connected in line with the capacitor bank, the feed mechanism, the rotating mechanism and the switch assembly, wherein the impedance is in the range of about 0.2 to about 0.8 ohms.

7. The apparatus of claim 6, wherein the impedance is in the range of about 0.2 to about 0.3 ohms.

8. The apparatus of claim 6, wherein the impedance is about 0.2 ohms.

9. The apparatus of claim 3, further comprising:
a microprocessor, connected to and configured to control, the feed mechanism and the rotating mechanism; and
sensors for sensing: longitudinal movement of the feed electrode, contact between the feed electrode and rotating electrode, and rotational movement of the rotating electrode, wherein the sensors are connected to the microprocessor for transmission of sensed information to the microprocessor;
wherein, in use, the microprocessor controls the movement of the feed electrode to adjust for consumption of the feed electrode and the rotating electrode, and may scour the distal ends of the feed electrode and the rotating electrode by bringing the distal ends into contact and rotating the rotating electrode.

10. The apparatus of claim 9, further comprising one or more of water temperature sensor, water conductivity sensor, acoustic neobate sensor, optical sensor, pH sensor, dissolved gas sensor, particle counter sensor, flow sensor and static pressure sensor, wherein the sensors are connected to the microprocessor for transmission of sensed information to the microprocessor.

11. The apparatus of claim 9, wherein:
the microprocessor is connected to and configured to control the switch feed mechanism and the switch rotating mechanism; and
the apparatus further comprising:
sensors for sensing: longitudinal movement of the switch feed electrode, contact between the switch feed electrode and the switch rotating electrode, and rotational movement of the switch rotating electrode, wherein the sensors are connected to the microprocessor for transmission of sensed information to the microprocessor;
wherein, in use, the microprocessor controls adjustment of the space between the distal ends of the switch feed electrode and the switch rotating electrode.

12. The apparatus of claim 3, wherein the electrodes are tempered carbon steel or aluminum, having a diameter of >9.52 mm (⅜ inch), and the switch electrodes are tungsten.

13. The apparatus of claim 1, further comprising a reservoir for containing the liquid in which the distal end of the feed electrode and distal end of the rotating electrode are immersed in use, wherein the reservoir comprises:
a tubular body made from polyvinyl chloride (PVC) pipe; and
two end caps, one end cap affixed to one end of the tubular body and the other end cap affixed to the other end of the tubular body.

14. The apparatus of claim 13, wherein the end caps are of sufficient density so as to act as acoustic reflectors wherein in use, the reservoir acts as an acoustic cavity resonator.

15. The apparatus of claim 14, wherein the end caps are cast iron.

16. The apparatus of claim 13, further comprising:
a liquid injection system configured for in use providing a second liquid having desirable qualities to the vicinity of the distal ends of the feed electrode and rotating electrode; and
a membrane affixed to the interior of the tubular body, for impeding the intermingling of the second liquid in the vicinity of the distal ends of the feed electrode and rotating electrode, with liquid on the other side of the membrane.

17. The apparatus of claim 1, wherein the microwave generator is configured to produce microwaves in the frequency range of about 1 GHz to about 3 GHz.

18. The apparatus of claim 1, further comprising a liquid injection system configured for in use providing a second liquid having desirable qualities to the vicinity of the distal ends of the feed electrode and rotating electrode.

19. The apparatus of claim 1, wherein the feed mechanism, the rotating mechanism and the power supply assembly are located within a Faraday cage.

* * * * *